United States Patent
Athad

(10) Patent No.: US 9,216,464 B2
(45) Date of Patent: Dec. 22, 2015

(54) MILLING TOOL AND MILLING TOOL BODY HAVING PRESSURE HOLES FOR SECURING CUTTING INSERTS

(71) Applicant: Iscar, Ltd., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 395 days.

(21) Appl. No.: 13/749,384

(22) Filed: Jan. 24, 2013

(65) Prior Publication Data

US 2014/0133925 A1    May 15, 2014

Related U.S. Application Data

(60) Provisional application No. 61/726,880, filed on Nov. 15, 2012.

(51) Int. Cl.
| | |
|---|---|
| B23C 5/16 | (2006.01) |
| B23C 5/22 | (2006.01) |
| B23C 5/08 | (2006.01) |
| B23C 5/24 | (2006.01) |

(52) U.S. Cl.
CPC ............ *B23C 5/2247* (2013.01); *B23C 5/08* (2013.01); *B23C 2210/161* (2013.01); *B23C 2210/168* (2013.01); *B23C 2265/08* (2013.01); *Y10T 407/192* (2015.01); *Y10T 407/1908* (2015.01)

(58) Field of Classification Search
CPC .... B23C 5/207; B23C 5/2243; B23C 5/2472; B23C 5/2239; B23C 5/2403; B23C 5/242
See application file for complete search history.

(56) References Cited

U.S. PATENT DOCUMENTS

| | | | | |
|---|---|---|---|---|
| 1,342,055 | A * | 6/1920 | Miller | 407/50 |
| 1,422,988 | A * | 7/1922 | Kienzl | 407/44 |
| 1,867,021 | A * | 7/1932 | Monosmith | 76/115 |
| 1,927,409 | A * | 9/1933 | Markstrum | 407/35 |
| 2,690,610 | A * | 10/1954 | Begle et al. | 407/36 |
| 2,840,887 | A * | 7/1958 | Donnelly | 407/36 |
| 2,958,119 | A * | 11/1960 | Stansfield et al. | 407/40 |
| 3,363,299 | A * | 1/1968 | Gowanlock | 407/39 |

FOREIGN PATENT DOCUMENTS

| | | |
|---|---|---|
| CH | 685 680 A5 | 9/1995 |
| CH | 688 794 A5 | 3/1998 |
| GB | 129 138 A | 7/1919 |

OTHER PUBLICATIONS

International Search Report dated Feb. 12, 2014 issued in PCT counterpart application (PCT/IL2013/050848).

* cited by examiner

*Primary Examiner* — Will Fridie, Jr.
(74) *Attorney, Agent, or Firm* — Womble Carlyle Sandridge & Rice PLLC

(57) ABSTRACT

A rotary milling tool body includes a circumferential clamping portion with opposite first and second side surfaces and a plurality of insert pockets and integral clamping jaws arranged therealong. Each clamping jaw includes opposite forward and rearward abutment surfaces which extend between the first and second side surfaces. Each clamping jaw further includes a throughgoing pressure hole which opens out only to the first and second side surfaces. Each clamping jaw further includes a pressure member which is located in the pressure hole and transferable between disengaged and engaged positions.

28 Claims, 2 Drawing Sheets

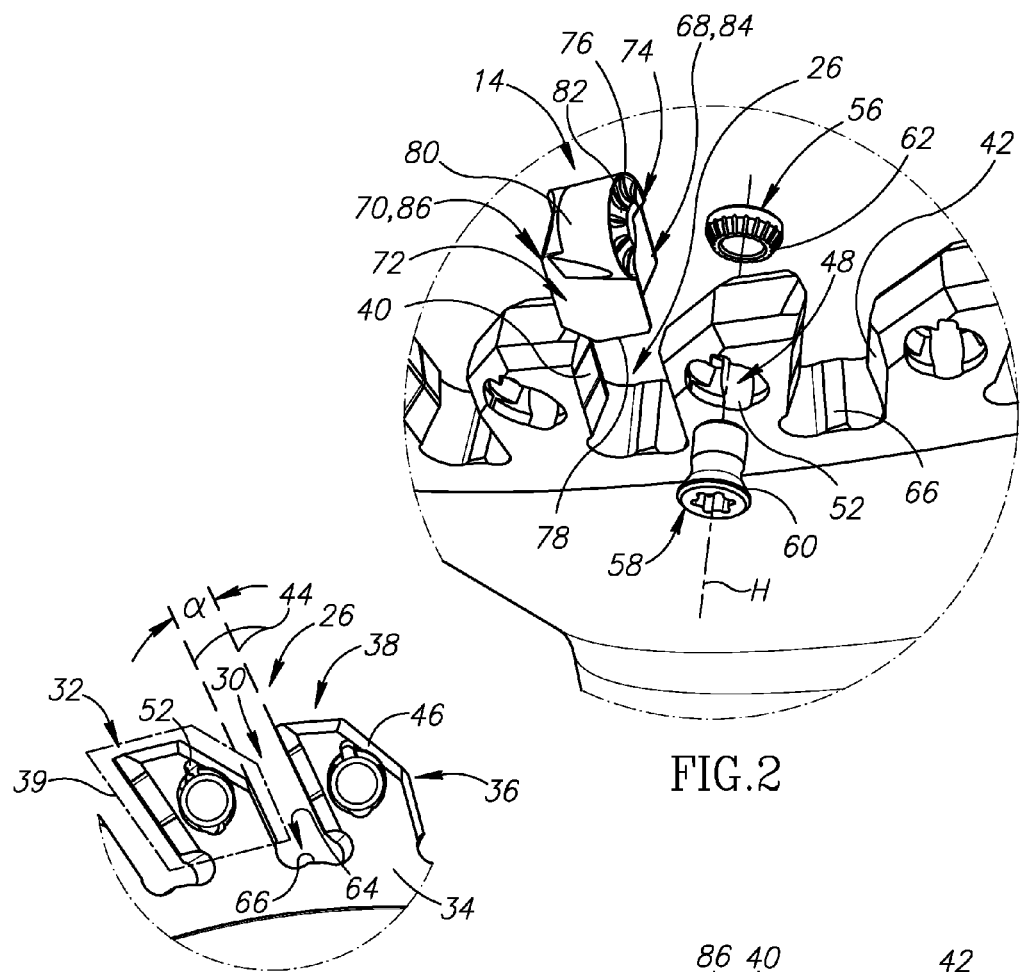

MILLING TOOL AND MILLING TOOL BODY HAVING PRESSURE HOLES FOR SECURING CUTTING INSERTS

RELATED APPLICATIONS

The present application claims priority to U.S. Provisional Patent Application No. 61/726,880, filed 15 Nov. 2012, the contents of which are incorporated by reference in their entirety.

FIELD OF THE INVENTION

The subject matter of the present application relates to rotary milling tools for metal cutting.

BACKGROUND OF THE INVENTION

Milling tools of the field are known and disclosed, for example, in U.S. Pat. No. 7,131,794.

SUMMARY OF THE INVENTION

In accordance with the subject matter of the present application there is provided a rotary milling tool body with a circumferential clamping portion, the circumferential clamping portion can comprise opposite first and second side surfaces and a plurality of insert pockets and integral clamping jaws alternatingly arranged therealong, each clamping jaw can comprise:

opposite forward and rearward abutment surfaces which extend between the first and second side surfaces, a throughgoing pressure hole which opens out only to the first and second side surfaces, and a pressure member located in the pressure hole and is transferable between disengaged and engaged positions.

In accordance with another aspect of the present application, there is further provided a rotary milling tool which comprises the milling body and multiple cutting inserts secured in respective insert pockets.

Any of the following features, either alone or in combination, may be applicable to any of the above aspects of the subject matter of the application:

The clamping jaw can have a unitary, one piece construction.

The pressure hole can extend between the forward and rearward abutment surfaces.

The pressure hole can have conical openings.

Each clamping jaw can be elastically deformable at a body portion, between the pressure hole and each of the first and second jaw sides.

In the engaged position, the pressure member applies indirect clamping forces (FI) outwardly, away from a longitudinal axis (H) of the pressure hole.

The clamping portion can comprise a single set of identical insert pockets.

The clamping portion can comprise a single set of identical clamping jaws.

The clamping jaw can be connected to the rest of the milling tool body only via a leg portion.

Each clamping jaw can be elastically deformable at a leg portion.

In a plan view of one of the side surfaces, the clamping jaw can have a closed shape.

In a plan view of each of the side surfaces, the forward and rearward abutment surfaces can appear as straight lines which can converge outwardly.

Each insert pocket can comprise a pocket stop surface located at an inner end of the insert pocket.

Each clamping jaw can comprise a deflection surface which is located at a head portion (38) of the clamping jaw, for deflecting chips away from the clamping portion.

The deflection surface can extend from the rearward abutment surface and can face outwardly, away from the clamping portion.

The clamping portion has N-fold rotational symmetry about a rotation axis (A) of the milling tool body.

The forward abutment surface faces a turning direction (T) of the milling body and the rearward abutment surface faces an opposite direction thereto.

The forward abutment surface can be V-shaped.

The rearward abutment surface can be V-shaped.

The pressure member can be a knurled nut and a screw, screwed therein.

Each cutting insert can include first and second main surfaces and a peripheral surface which extends therebetween, at least one of the first and second main surfaces can meet the peripheral surface at an edge, at least a portion of which is a cutting edge, the first and second main surfaces comprising respective first and second abutment surfaces, the peripheral surface comprising an insert stop surface.

The first abutment surface abuts the rearward abutment surface of a clamping jaw located in front of the cutting insert in a rotation direction (T); the second abutment surface abuts the forward abutment surface of an adjacent camping jaw behind the cutting insert; and wherein the insert stop surface abuts the pocket stop surface.

In the engaged position, the pressure member applies an indirect clamping force FI on the cutting insert.

In the engaged position, at least one of the forward and rearward abutment surfaces applies an indirect clamping force FI on the cutting insert.

The cutting insert is transferable between a clamped position and a secured position, and wherein in a secured position, the pressure member is in an engaged position.

BRIEF DESCRIPTION OF THE DRAWINGS

For a better understanding of the subject matter of the present application and to show how the same may be carried out in practice, reference will now be made to the accompanying drawings, in which:

FIG. 2 is an exploded view of a portion of the milling tool of FIG. 1;

FIG. 3 is a plan side view of a clamping portion of the milling tool; and

FIG. 4 is a cross sectional view taken along line IV-IV of FIG. 1.

Figure 1:
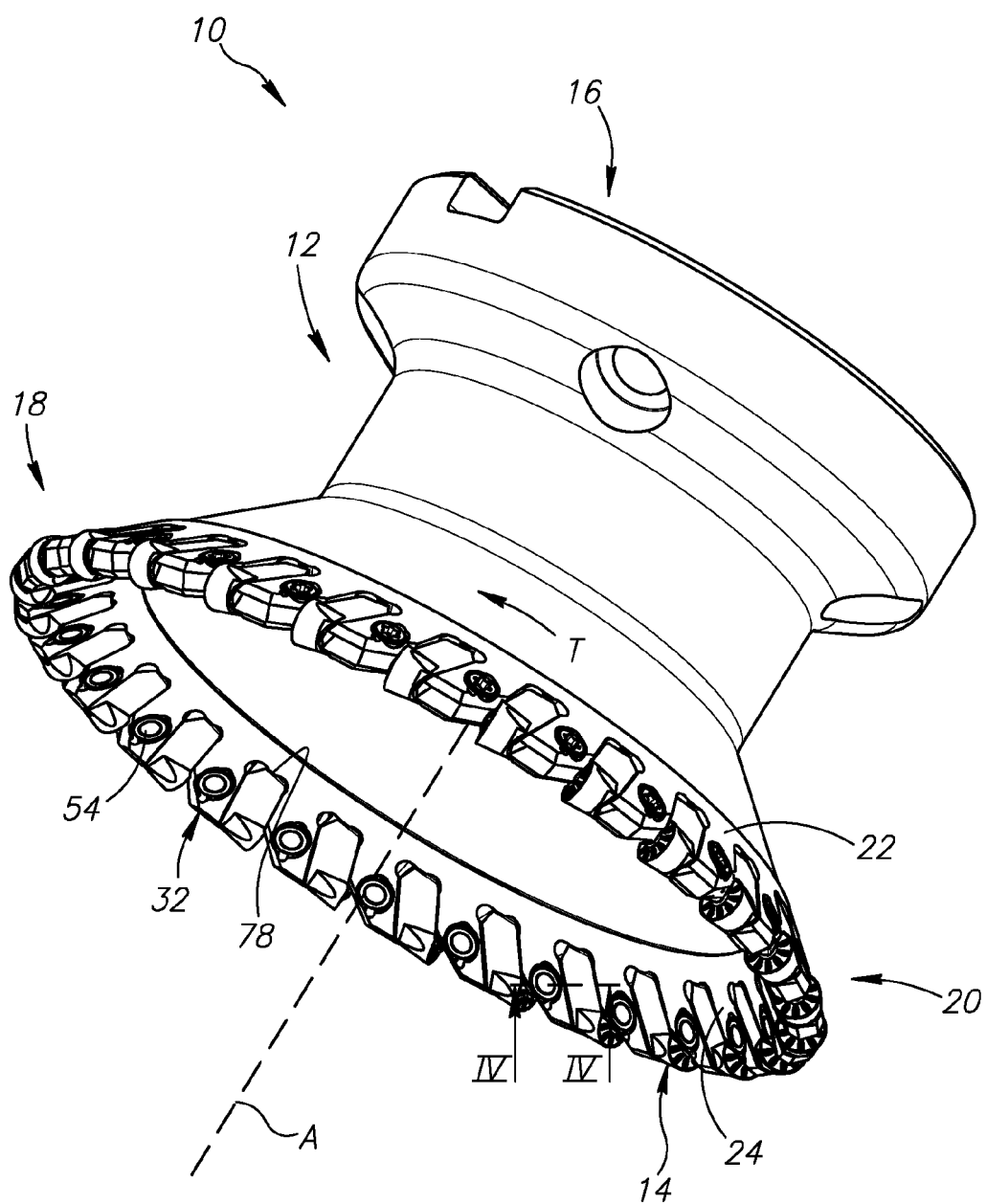
FIG. 1 is an isometric view of a rotary milling tool.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Reference is made to FIG. 1. A rotary milling tool 10 includes a rotary milling tool body 12 and cutting inserts 14 secured therein. The milling tool 10 has a rotation axis A which defines a rotation direction T.

The milling tool body 12 has a mounting end 16 configured for securing the milling tool body 12 onto a milling machine, and a cutting end 18 opposite the mounting end 16. At the cutting end 18, the milling tool body 12 includes a circumferential clamping portion 20 configured with N-fold rotational symmetry about the rotation axis A (wherein N is a number representing a total number of cutting inserts 14, or groups thereof, in the milling tool 10).

The clamping portion 20 has opposite first and second side surfaces 22, 24. The first and second side surfaces 22, 24 can be parallel. The clamping portion 20 includes multiple recesses 26 along its circumference. The recesses 26 can be identical. According to the subject matter of the present example, the milling tool body 12 includes only a single set of recesses 26. Each recess 26 defines a single insert pocket 30 therein. Therefore, the milling tool body 12 can include a single set of identical insert pockets 30. Advantageously, this is a simple structure, which can be cheap to manufacture. A clamping jaw 32 is defined between each two adjacent recesses 26. The milling tool body 12 can include single set of identical clamping jaws 32. The insert pockets 30 and clamping jaws 32 can alternate along the entire circumference of the clamping portion 20. As seen in FIG. 1, the first and second side surfaces 22, 24 and the clamping portion 20 (and also the clamping jaws 32) may be angled at a non-zero angle with respect to the rotation axis A, providing the cutting end 18 with a cone-shaped appearance.

Attention is drawn to FIGS. 2 and 3. Each clamping jaw 32 is a unitary, one-piece, integral part of the milling tool body 12. Each clamping jaw 32 projects from the milling tool body 12. Each clamping jaw 32 can have a leg portion 34, a body portion 36 and a head portion 38. The head portion 38 is connected to the body portion 36. The body portion 36 is connected to the rest of the milling tool body 12 only via the leg portion 34. In a plan view of any of the first or second side surfaces 22, 24, the leg portion 34 can be narrower than the body portion 36. The leg portion 34 can be elastically deformable in order to allow bending of the clamping jaw 32 thereabout.

Each clamping jaw 32 has a forward abutment surface 40 and an opposite rearward abutment surface 42. The forward and rearward abutment surfaces 40, 42 extend between the first and second side surfaces 22, 24. The forward abutment surface 40 can be located in, or extend along, the head portion 38 and the body portion 36. The rearward abutment surface 42 can be located in the body portion 36. The forward abutment surface 40 faces the rotation direction T and the rearward abutment surface 42 faces opposite thereto. The forward and rearward abutment surfaces 40, 42 are configured to abut and secure the cutting insert 14. The forward and rearward abutment surfaces 40, 42 can have V-shaped cross sections. The V-shaped cross-sections assist in reducing lateral movement of the cutting insert 14 in the insert pocket 30. The forward and rearward abutment surface 40, 42 can have a convex V-shaped cross section.

As shown in FIG. 3, according to the present example, at least portions of adjacent forward and rearward abutment surfaces 40, 42 of respective adjacent clamping jaws 32 can appear as straight lines in a side view of the clamping jaws 32, i.e., in a plan view of any of the first or second side surfaces 22, 24. These lines will be referred to herein as clamping jaw lines 44, which may correspond to the bottom of the V-shape cross-sections. In the same view, the clamping jaw lines 44 can converge outwardly. According to the subject matter of the present example, an acute convergence angle α<3° is defined between the clamping jaw lines 44, or between the forward and rearward abutment surfaces 40, 42 which face each other and belong to adjacent clamping jaws 32.

Each clamping jaw 32 includes a deflection surface 46 which is located at the head portion 38, for deflecting cut chips away from the clamping portion 20. The deflection surface 46 extends from the rearward abutment surface 42 and faces outwardly, away from the clamping portion 20.

In a plan view of one of the first or second side surfaces 22, 24, a footprint 39 (indicated by dashed lines in FIG. 3) defined by the body portion 36 and the head portion 38 of the clamping jaw 32 has a closed shape. The term "closed shape" is used in a sense that in the same view, at the body portion 36 and the head portion 38, the clamping jaw 32 has a continuous periphery, i.e., has no recesses which open out outwardly. The closed shape of the clamping jaw 32 can improve general rigidity of the milling tool 10.

Attention is drawn to FIGS. 2, 3 and 4. Each clamping jaw 32 has a throughgoing pressure hole 48 with a longitudinal hole axis H. The pressure hole 48 extends in a thickness direction of the clamping portion 20, or generally parallel to the rotation axis A. Manufacturing the pressure holes 48 is simple and inexpensive. The pressure hole 48 can extend between the forward and rearward abutment surfaces 40, 42. The pressure hole 48 only opens out to the first and second side surfaces 22, 24, which e.g., allows maintaining the closed shape of the clamping jaw 32. According to the subject matter of the present example, the pressure hole 48 opens out to the first and second side surfaces 22, 24 at conical openings 50 (FIG. 4). The pressure hole 48 can be located in the body portion 36. As will be further explained herewith, this can enable elastic deformation of the body portion 36. The pressure hole 48 can include grooves 52 which extend along the hole axis H. The grooves 52 can help improve expansion, or deformation, of the body portion 36 (FIGS. 2 and 3).

Attention is drawn to FIGS. 2 and 4. Each clamping jaw 32 has a pressure member 54 located in the pressure hole 48. According to the subject matter of the present example, the pressure member 54 is a knurled nut 56 with a screw 58 screwed therein. The screw 58 has a conical screw head 60 and the nut has a conical knurled outer surface 62. The knurled outer surface 62 communicates with one of the conical openings 50 of the pressure hole 48 such that when the screw 58 is tightened, rotation of the knurled nut 56 is limited, or entirely prevented, by friction forces.

The pressure member 54 is transferable between a disengaged position and an engaged position. In the disengaged position, the pressure member 54 does not apply forces on the clamping jaw 32 in the rotation direction T and in the opposite direction thereto (e.g., the screw 58 can be loose). In the engaged position, the pressure member 54 applies (outwardly directed) indirect clamping forces FI on the body portion 36 in the rotation direction T and in an opposite direction thereto. Due to the conical structure of the knurled nut 56 and screw head 60, axial screw forces FH (generated along the hole axis H by tightening the screw 58) are partially transformed (i.e., change their direction) into the indirect clamping forces FI. These forces can enable the elastic deformation in the body portion 36 (between the pressure hole 48 and each of the forward and rearward abutment surfaces 40, 42) which, in turn, can expand in the rotation direction T and in the opposite direction thereto, respectively. Specifically, according to one example wherein the body portion 36 expands, the forward and rearward abutment surfaces 40, 42 can move away from one another, i.e., the forward abutment surface 40 is displaced in the direction of rotation T and the rearward abutment surface 42 is displaced in the opposite direction. However, some test results show that the expansion of the body portion 36 does not necessarily have to occur (and can be minimal, or not occur at all) for the pressure member 54 to apply the indirect clamping forces on the cutting insert 14.

Each insert pocket 30 is located between two clamping jaws 32. Each insert pocket 30 includes one pair of opposite forward and rearward abutment surfaces 40, 42, of respective adjacent clamping jaws 32. The insert pocket 30 can opens out to the first and second side surfaces 22, 24. The insert pocket 30 opens out outwardly, away from the rotation axis A. The insert pocket 30 has an inner end 64. The inner end 64 can include a pocket stop surface 66. The pocket stop surface 66 can be located between the two leg portions 34 of the respective adjacent clamping jaws 32. The pocket stop surface 66 can be planar. The pocket stop surface 66 can face in a direction parallel to that of any of the clamping jaw lines.

Attention is drawn to FIGS. 1, 2 and 4. The cutting insert 14 can include opposite first and second main surfaces 68, 70 and a peripheral surface 72 which extends therebetween. The first and second main surfaces 68, 70 can meet the peripheral surface 72 at edges 74. At least a portion of the edges 74 can be a cutting edge 76. The peripheral surface 72 can include an insert stop surface 78 and an opposite relief surface 80. The first main surface 68 can include a rake surface 82 and a first abutment surface 84. The second main surface 70 can include a second abutment surface 86. The first and second abutment surfaces 84, 86 can have a V-shaped cross section, (which can correspond in shape to the forward and rearward abutment surfaces 40, 42) at least for reducing lateral movement of the cutting insert 14 in the insert pocket 30. The first and second abutment surfaces 84, 86 can have a concave V-shaped cross section.

According to the subject matter of the present example, in a clamped position, each cutting insert 14 is slidingly inserted, or installed, into a respective insert pocket 30 and adjacent pressure members 54 are in a disengaged position. The first abutment surface 84 abuts the rearward abutment surface 42 of a clamping jaw 32 located in front of the cutting inset (in the rotation direction T). The second abutment surface 86 abuts the forward abutment surface 40 of an adjacent clamping jaw 32. The insert stop surface 78 abuts the pocket stop surface 66.

According to the subject matter of the present example, in each insert pocket 30, the convergence angle α and the spacing between the forward and rearward abutment surfaces 40, 42, can be chosen such that the clamping jaws 32 apply self-clamping forces FS on the cutting insert 14 in the clamped position. The self-clamping forces FS are generated since the cutting insert 14 pushes the adjacent clamping jaws 32 away from one another (thus elastically bending the clamping jaws 32, e.g., at the leg portion 34). The self-clamping forces FS can generate friction forces which can prevent the cutting insert 14 from falling out of the insert pocket 30, e.g., during installation of other cutting inserts 14.

During a clamped position of any given cutting insert 14, inserting other cutting inserts 14 into at least one of the two neighboring insert pockets 30 (e.g., in a situation wherein respective adjacent pressure members 54 on both sides of the cutting insert 14 are in the disengaged position) can increase the self-clamping force FS on the given cutting insert 14. This, since the self-clamping forces are accumulated along the clamping portion 20 due to continuous contact between clamping jaws 32 and cutting inserts 14.

Attention is drawn to FIG. 4. In a secured position, the cutting insert 14 is located in the insert pocket 30 and at least one of the two adjacent pressure members 54 (in the present example, the screw 58 and knurled nut 56 arrangement) is in the engaged position. The indirect clamping forces FI are applied on the cutting insert 14 via the adjacent forward and rearward abutment surfaces 40, 42 of the insert pocket 30 (each of which belongs to different adjacent clamping jaws 32).

Some test results show that after insertion of all cutting inserts 14 into the insert pockets 30 (while all the cutting inserts 14 are in a clamping position) a substantial amount of self-clamping forces FS can be generated in the clamping portion 20. However, these forces may not be enough to ensure secure clamping during machining operations. Transferring the cutting insert 14 from a clamping position to a secure position ensures that enough forces are generated to secure the cutting insert 14 in place.

The description above includes exemplary embodiments and details for enablement, if needed, of claimed subject matter, and does not exclude non-exemplified embodiments and details from the claim scope of the present application.

What is claimed is:

1. A rotary milling tool body (12) having a rotation axis (A), a rotation direction (T), and comprising a circumferential clamping portion (20),
    the clamping portion (20) comprising opposite first and second side surfaces (22, 24) and a plurality of insert pockets (30) and integral clamping jaws (32) alternatingly arranged therealong,
    each clamping jaw (32) comprising:
        opposite forward and rearward abutment surfaces (40, 42) extending between the first and second side surfaces (22, 24),
        a throughgoing pressure hole (48) opening out only to the first and second side surfaces (22, 24) such that the clamping jaw (32) has a closed shape and a footprint of the clamping jaw has a continuous periphery, and
        a pressure member (54) located in the pressure hole (48) and being transferable between disengaged and engaged positions.

2. The milling tool body (12) according to claim 1, wherein the clamping jaw (32) has a unitary, one piece construction.

3. The milling tool body (12) according to claim 1, wherein the pressure hole (48) extends between the forward and rearward abutment surfaces (40, 42).

4. The milling tool body (12) according to claim 1, wherein the pressure hole (48) has conical openings (50).

5. The milling tool body (12) according to claim 1, wherein each clamping jaw (32) is elastically deformable at a body portion (36), between the pressure hole (48) and each of the first and second jaw sides.

6. The milling tool body (12) according to claim 1, wherein in the engaged position, the pressure member (54) applies indirect clamping forces (FI) outwardly, away from a longitudinal axis (H) of the pressure hole (48).

7. The milling tool body (12) according to claim 1, wherein the clamping portion (20) comprises a single set of identical insert pockets (30).

8. The milling tool body (12) according to claim 1, wherein the clamping portion (20) comprises a single set of identical clamping jaws (32).

9. The milling tool body (12) according to claim 1, wherein the clamping jaw (32) is connected to the rest of the milling tool body (12) only via a leg portion (34).

10. The milling tool body (12) according to claim 1, wherein each clamping jaw (32) is elastically deformable at a leg portion (34).

11. The milling tool body (12) according to claim 1, wherein in a plan view of one of the side surfaces (22, 24), a footprint (39) defined by the body portion (36) and head portion (38) of each clamping jaw (32) has a closed shape.

12. The milling tool body (12) according to claim 1, wherein in a plan view of each of the side surfaces (22, 24), the forward and rearward abutment surfaces (40, 42) appear as straight lines which converge outwardly.

13. The milling tool body (12) according to claim 1, wherein each insert pocket (30) comprises a pocket stop surface (66) located at an inner end (64) of the insert pocket (30).

14. The milling tool body (12) according to claim 1, wherein each clamping jaw (32) comprises a deflection surface (46) which is located at a head portion (38) of the clamping jaw (32), for deflecting chips away from the clamping portion (20).

15. The milling tool body (12) according to claim 14, wherein the deflection surface (46) extends from the rearward abutment surface (42) and faces outwardly, away from the clamping portion (20).

16. The milling tool body (12) according to claim 1, wherein the clamping portion (20) has N-fold rotational symmetry about the rotation axis (A).

17. The milling tool body (12) according to claim 1, wherein the forward abutment surface (40) faces the turning direction (T) of the milling body and the rearward abutment surface (42) faces an opposite direction thereto.

18. The milling tool body (12) according to claim 1, wherein the forward abutment surface (40) is V-shaped.

19. The milling tool body (12) according to claim 1, wherein the rearward abutment surface (42) is V-shaped.

20. The milling tool body (12) according to claim 1, wherein the pressure member (54) is a knurled nut (56) and a screw (58) screwed therein.

21. A rotary milling tool (10) comprising the milling body according to claim 1 and a cutting insert (14) secured in each of the insert pockets (30).

22. The milling tool (10) according to claim 21, wherein
each cutting insert (14) comprises first and second main surfaces (68, 70) and a peripheral surface (72) extending therebetween,
at least one of the first and second main surface (68, 70) meets the peripheral surface (72) at an edge (74), at least a portion of which is a cutting edge (76),
the first and second main surfaces comprise respective first and second abutment surfaces (84, 86),
the peripheral surface (72) comprises an insert stop surface (78).

23. The milling tool (10) according to claim 21, wherein
the first abutment surface (84) abuts the rearward abutment surface (42) of a clamping jaw (32) located in front of the cutting insert (14) in the rotation direction (T);
the second abutment surface (86) abuts the forward abutment surface (40) of an adjacent clamping jaw behind the cutting insert (14); and
the insert stop surface (78) abuts a pocket stop surface (66) of the insert pocket (30).

24. The milling tool (10) according to claim 21, wherein, when the pressure member (54) is in the engaged position, the pressure member (54) applies an indirect clamping force (FI) on the cutting insert (14).

25. The milling tool according to claim 24, wherein
the cutting insert (14) is transferable between a clamped position and a secured position;
the pressure member (54) is in the engaged position; and
the indirect clamping force (FI) applied by the pressure member (54) maintains the cutting insert in the secured position.

26. The milling tool (10) according to claim 21, wherein, when the pressure member (54) is in the engaged position, at least one of the forward and rearward abutment surfaces (40, 42) applies an indirect clamping force (FI) on the cutting insert (14).

27. The milling tool according to claim 26, wherein
the cutting insert (14) is transferable between a clamped position and a secured position, and
the pressure member (54) is the engaged position; and
the indirect clamping force (FI) applied by said at least one of the forward and rearward abutment surfaces (40, 42) maintains the cutting insert (14) in the secured position.

28. A rotary milling tool body (12) having a rotation axis (A), a rotation direction (T), and comprising a circumferential clamping portion (20),
the clamping portion (20) comprising opposite first and second side surfaces (22, 24) and a plurality of insert pockets (30) and integral clamping jaws (32) alternatingly arranged therealong,
each clamping jaw (32) comprising:
opposite forward and rearward abutment surfaces (40, 42) extending between the first and second side surfaces (22, 24),
a throughgoing pressure hole (48) opening out only to the first and second side surfaces (22, 24), and
a pressure member (54) located in the pressure hole (48) and being transferable between disengaged and engaged positions; wherein:
each clamping jaw (32) comprises a deflection surface (46) which is located at a head portion (38) of the clamping jaw (32), for deflecting chips away from the clamping portion (20).

* * * * *